United States Patent
Teng

(10) Patent No.: US 6,712,465 B1
(45) Date of Patent: Mar. 30, 2004

(54) EYEGLASSES HAVING ADDITIONAL, REPLACEABLE LENSES

(75) Inventor: Wei-Che Teng, Tainan (TW)

(73) Assignee: Irene Corporation, Tainan (TW)

( * ) Notice: Subject to any disclaimer, the term of this patent is extended or adjusted under 35 U.S.C. 154(b) by 0 days.

(21) Appl. No.: 10/426,887

(22) Filed: Apr. 30, 2003

(51) Int. Cl.$^7$ ................................. G02C 9/00
(52) U.S. Cl. ............................. 351/47; 351/57
(58) Field of Search ..................... 351/47, 57, 48, 351/58, 44, 41

(56) References Cited

U.S. PATENT DOCUMENTS 6,086,199 A * 7/2000 Holland et al. ............... 351/86
6,550,912 B2 * 4/2003 Vitaloni ....................... 351/47

* cited by examiner

Primary Examiner—Hung Xuan Dang
(74) Attorney, Agent, or Firm—Alan D. Kamrath; Rider Bennett, LLP.

(57) ABSTRACT

A pair of eyeglasses comprises a frame comprising two first lens, two bifurcated first end pieces each including a channel, and a cavity in a bridge; two replaceable lens frames each comprising a second lens (e.g., tinted lenses), a second end piece at one end, the second end piece being threadedly fastened in the channel, a rear tab at the other end releasbly fastened in the cavity, and at least one ridge on the tab, the ridge being urged against inside of the cavity; and two temple pieces each having a forward connecting end pieces pivotably, threadedly fastened in the channel.

3 Claims, 3 Drawing Sheets

EYEGLASSES HAVING ADDITIONAL, REPLACEABLE LENSES

BACKGROUND OF THE INVENTION

1. Field of the Invention

The present invention relates to eyeglasses and more particularly to a pair of eyeglasses having a pair of additional lenses (e.g., tinted lenses) which can be easily replaced as desired.

2. Description of Related Art

Eyeglasses having a pair of additional myopic, presbyopic, or tinted lenses are well known. Typically, such lenses are hanged on top of frame. In use, a person can pivot down the lenses for viewing. However, the prior hanging arrangement is not reliable in fastening. In other words, the additional lenses are subject to disengagement. Hence, a need for improvement exists.

SUMMARY OF THE INVENTION

It is an object of the present invention to provide a pair of eyeglasses, comprising a frame comprising two first lens, two bifurcated first end pieces each including a channel, and a cavity in a bridge; two replaceable lens frames each comprising a second lens, a second end piece at one end, the second end piece being threadedly fastened in the channel, a rear tab at the other end releasbly fastened in the cavity, and at least one ridge on the tab, the ridge being urged against inside of the cavity and two temple pieces each having a forward connecting end pieces pivotably, threadedly fastened in the channel.

In one aspect of the present invention, the second lenses are tinted lenses.

The above and other objects, features and advantages of the present invention will become apparent from the following detailed description taken with the accompanying drawings.

DETAILED DESCRIPTION OF THE PREFERRED EMBODIMENTS

Figure 1:
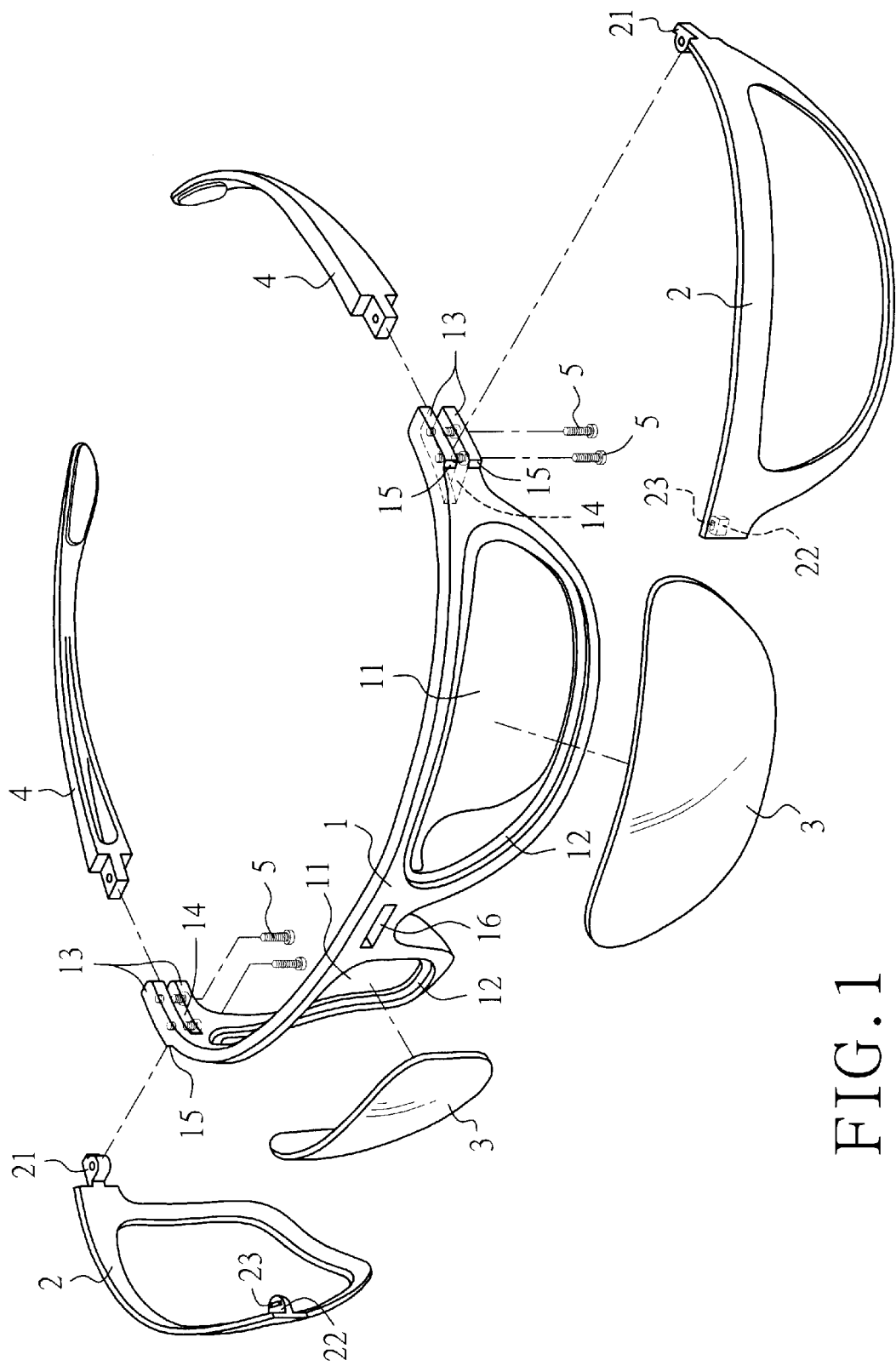
FIG. 1 is an exploded view of a preferred embodiment of eyeglasses according to the invention.
Figure 2:
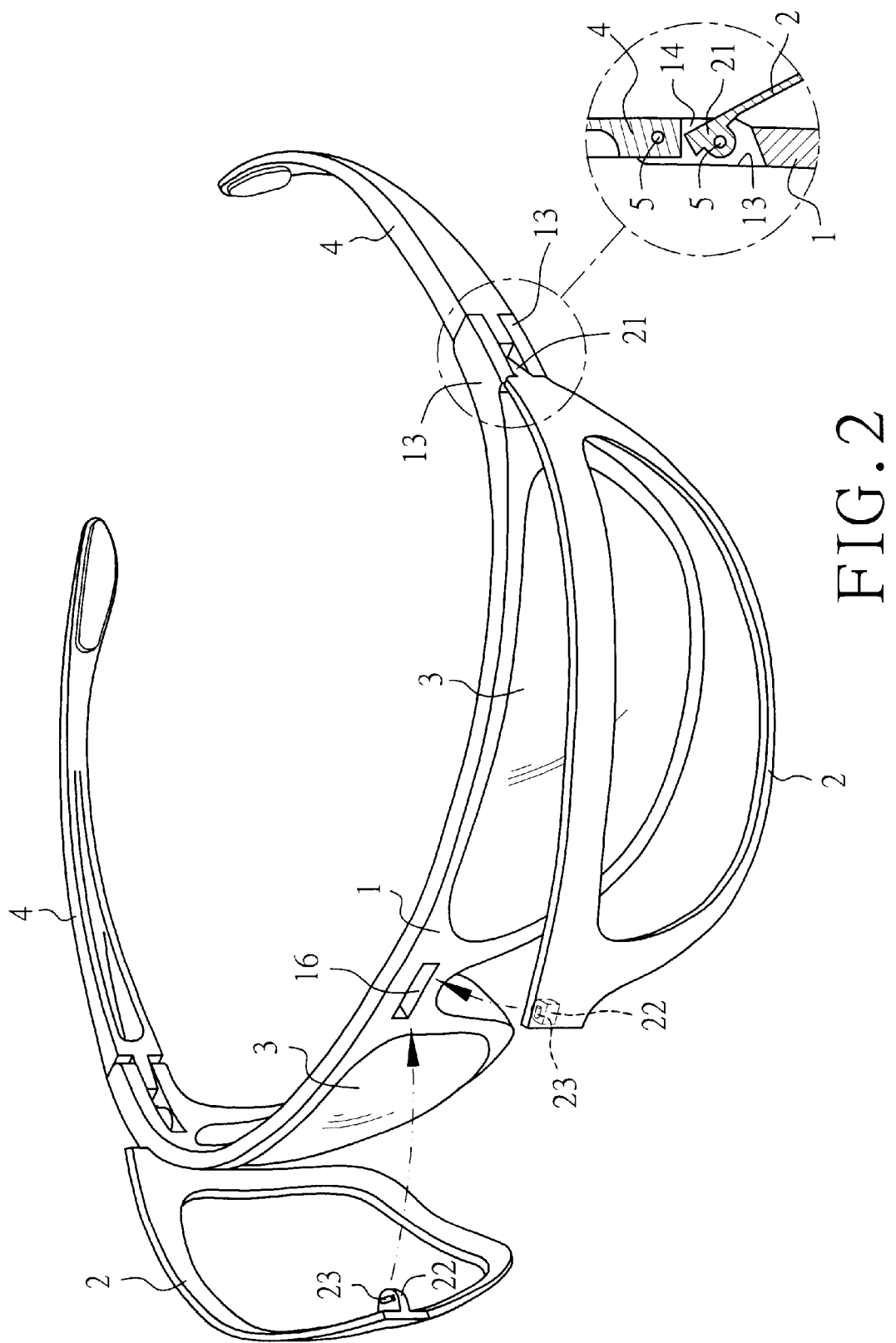
FIG. 2 is a partially assembled view of FIG. 1 with an end piece of the frame shown in detail at circle A in the partially assembled state.
Figure 3:
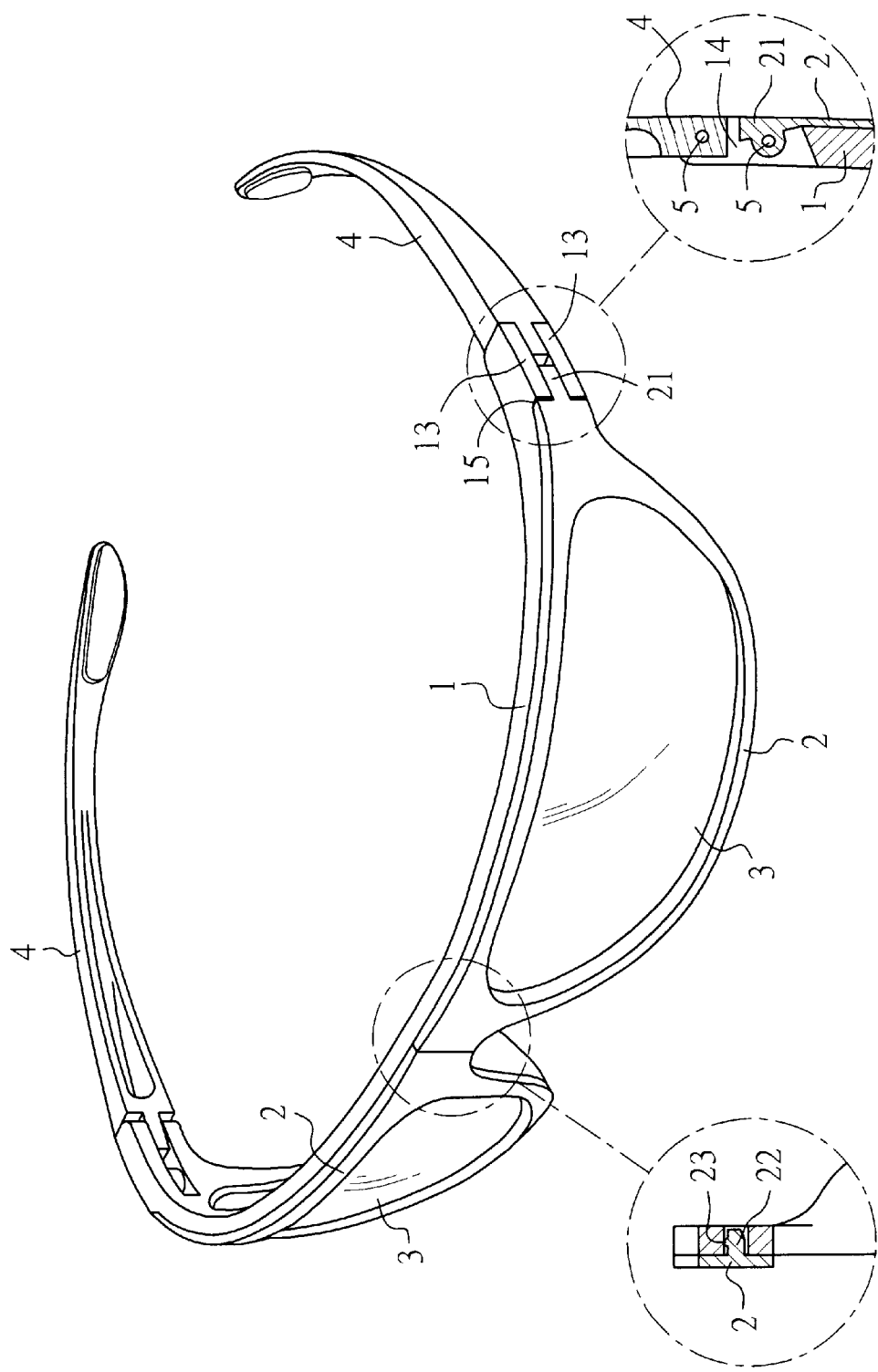
FIG. 3 is an assembled view of FIG. 1 with a bridge shown in detail at circle B and the end piece of the frame shown in detail at circle C in the fully assembled state.

Referring to FIGS. 1 to 3, there are shown a pair of eyeglasses constructed in accordance with the invention.

The eyeglasses comprises a frame 1 comprising two spaces 11 each bordered by a peripheral groove 12 for fitting a lens 3 therein, two bifurcated end pieces 13 each including a channel 14 and an oblique surface (or curved surface in any of other embodiments) 15 for ease of coupling an eyeglass component to the end piece 13, and a cavity 16 in a bridge; two additional lens frames 2 with desired lenses fitted therein, each lens frame 2 comprising an end piece 21 at one end, the end piece 21 being fastened in the channel 14 by driving a screw 5 through the end piece 21 and an aperture in the end piece 13, a rear tab 22 at the other end releasbly fastened in the cavity 16 by snapping, and a ridge 23 projected from a top of the tab 22, the ridge 23 being urged against inside of the cavity 16 for providing an additional fastening of the tab 22 in the cavity 16; and two temple pieces 4 each having a forward connecting end pieces (not numbered) pivotably fastened in the channel 14 by driving another screw 5 through another aperture in the end piece 13 and the connecting end piece.

Moreover, a person may change the lens frames 2 as desired. For example, a pair of blue lenses fitted in the lens frames 2 may be replaced with a pair of yellow lenses fitted in another pair of lens frames 2 by first detaching the existing lens frames 2 prior to replacement. This procedure is simple and easy.

While the invention herein disclosed has been described by means of specific embodiments, numerous modifications and variations could be made thereto by those skilled in the art without departing from the scope and spirit of the invention set forth in the claims.

What is claimed is:

1. A pair of eyeglasses, comprising:

a frame comprising two first lens, two bifurcated first end pieces each including a channel, and a cavity in a bridge;

two replaceable lens frames each comprising a second lens, a second end piece at one end, the second end piece being threadedly fastened in the channel, a rear tab at the other end releasably fastened in the cavity, and at least one ridge on the tab, the ridge being urged against inside of the cavity; and two temple pieces each having a forward connecting end pieces pivotably, threadedly fastened in the channel.

2. The pair of eyeglasses of claim 1, wherein each of the first end pieces further comprises an oblique surface in the channel.

3. The pair of eyeglasses of claim 1, wherein each of the first end pieces further comprises a curved surface in the channel.

* * * * *